E. H. WEATHERHEAD & T. H. SCHUTT.
WATER DISTRIBUTING APPARATUS.
APPLICATION FILED MAR. 29, 1915.
1,201,660.
Patented Oct. 17, 1916.
3 SHEETS—SHEET 2.
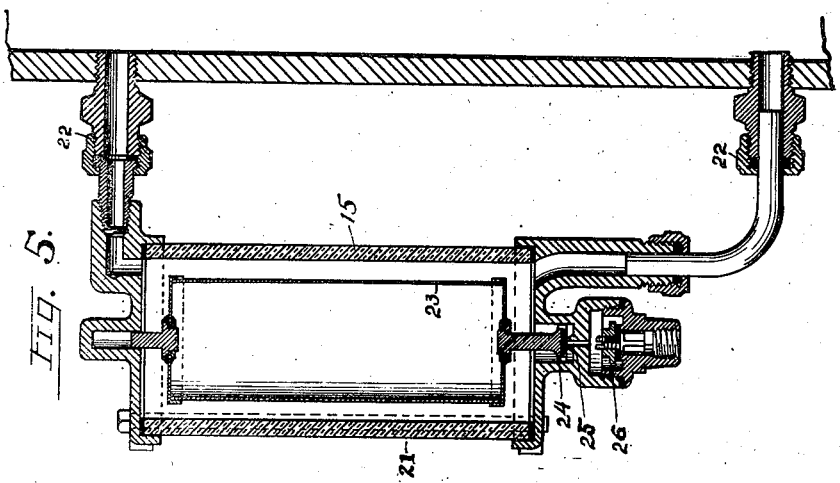
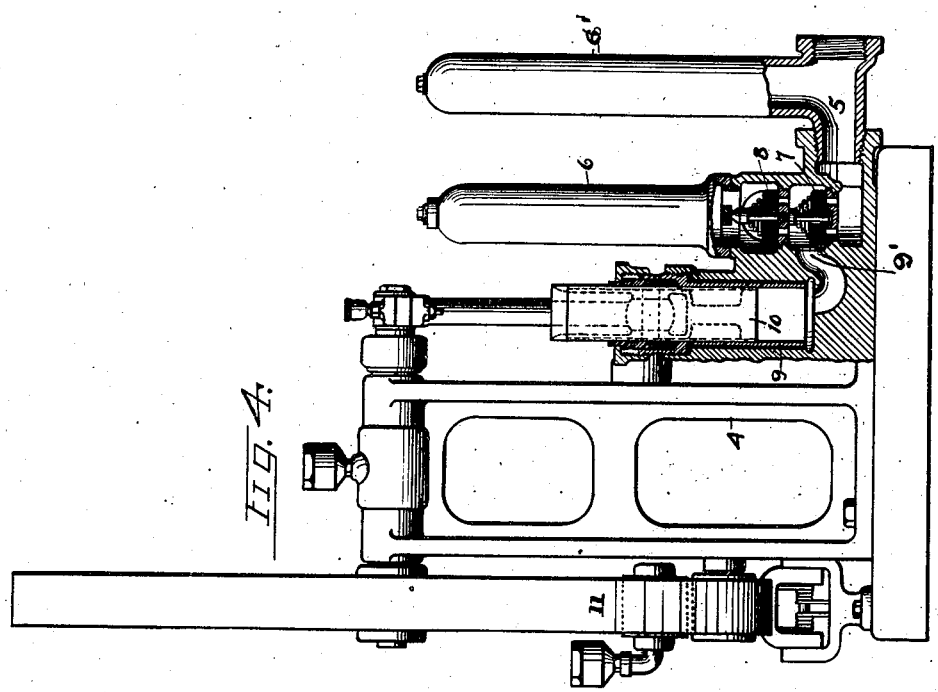
WITNESS
Geo. E. Kricker.
INVENTORS.
E. H. WEATHERHEAD.
T. H. SCHUTT.
Fisher & Moser
ATTORNEYS.

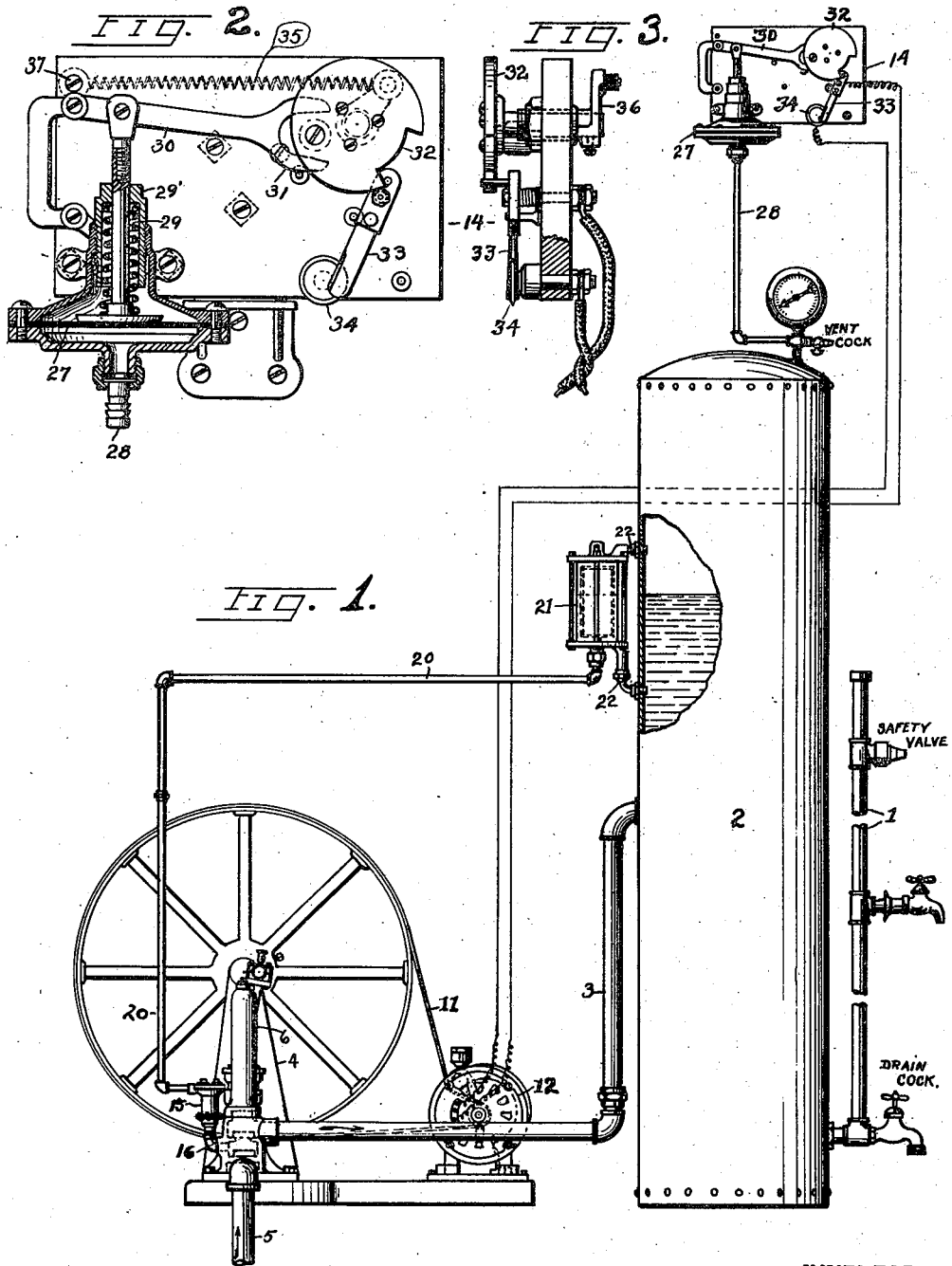

E. H. WEATHERHEAD & T. H. SCHUTT.
WATER DISTRIBUTING APPARATUS.
APPLICATION FILED MAR. 29, 1915.
1,201,660.
Patented Oct. 17, 1916.
3 SHEETS—SHEET 3.
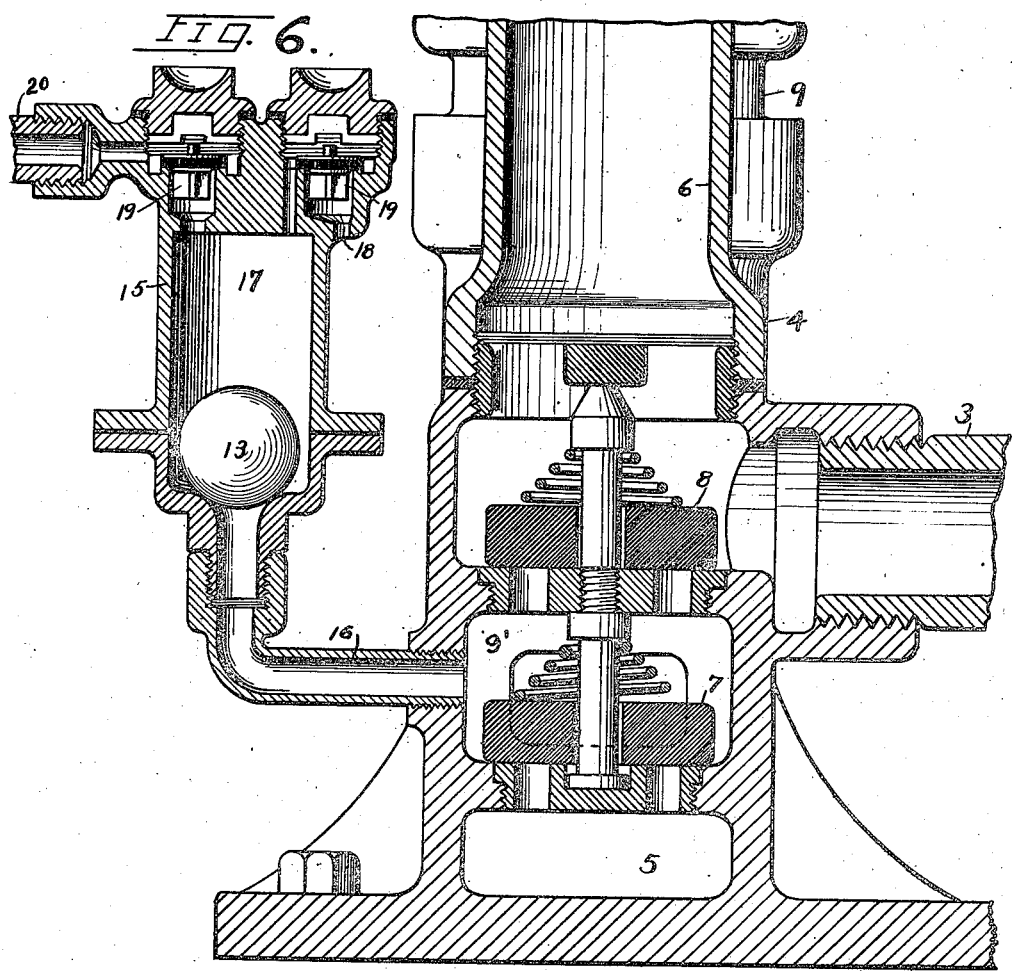
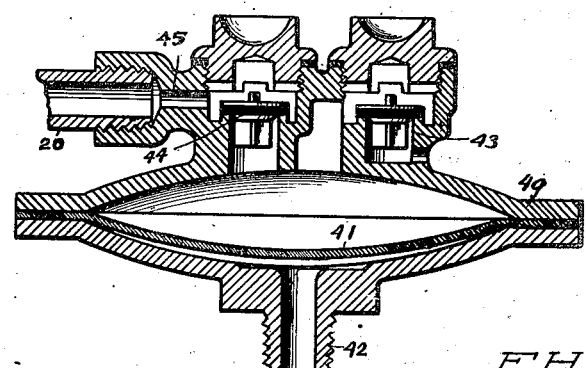
WITNESS:
Geo. E. Kricker.
INVENTORS.
E. H. Weatherhead,
T. H. Schutt.
by Fisher & Moser
ATTORNEYS.

UNITED STATES PATENT OFFICE.

EDWARD H. WEATHERHEAD AND THEODORE H. SCHUTT, OF CLEVELAND, OHIO, ASSIGNORS TO THE BISHOP-BABCOCK-BECKER COMPANY, OF CLEVELAND, OHIO, A CORPORATION OF OHIO.

WATER-DISTRIBUTING APPARATUS.

1,201,660.   Specification of Letters Patent.   Patented Oct. 17, 1916.

Application filed March 29, 1915. Serial No. 17,888.

*To all whom it may concern:*

Be it known that we, EDWARD H. WEATHERHEAD and THEODORE H. SCHUTT, citizens of the United States, residing at Cleveland, in the county of Cuyahoga and State of Ohio, have invented certain new and useful Improvements in Water-Distributing Apparatus, of which the following is a specification.

This invention relates to improvements in water-distributing apparatus, and the primary object of the invention is to provide a simple and effective automatic apparatus for delivering an ample supply of water by air pressure through the service pipes of a residence or other place of use, without constant care and supervision of the apparatus, and at an exceptionally low operating expense.

Water-distributing systems which are dependent upon a stored supply of compressed air to force the water any distance or height through service pipes, require a given amount of air in the reservoir or tank as well as a given pressure. Heretofore, the practice has been to pump the water into the tank and also to force air into the tank continuously during the operation of the water pump, but this mode of operation is objectionable for the reason that it has been found exceedingly difficult to maintain constantly just the right proportion of air in the tank. Such apparatus requires frequent attention either to vent the tank when too much air accumulates therein or to drain the tank of water when too much water is stored therein. The result of too much air and not enough water, or too much water and not enough air, is that the flow or amount of water delivered is more or less decreased compared with the normal working of the apparatus and at an increased operating cost because the motor and pumps are caused to operate more often and under certain conditions every time water is withdrawn from the service pipes. A constantly accumulating excess of water within the tank gives the most trouble usually, as this condition gradually reduces the volume of air within the tank until finally practically no water will be discharged. In brief, loss or decrease in volume of air below any given requirement prevents delivery of the requisite quantity of water and where such loss of air occurs repeatedly the apparatus will be deficient correspondingly and absolutely ineffective eventually.

The source of the trouble is often due to the kind of water pumped into the tank, or to the length of time that the apparatus remains idle, as it is well known that water will absorb a certain amount of air, particularly water classed as dead water. In such cases the water level in the tank gradually rises beyond the normal and desired level and the cubic area of the air chamber is correspondingly decreased until the only remedy is to drain the tank of its contents and to reëstablish the proper working conditions.

The present invention is designed to overcome all of the objections noted as will now appear.

In the accompanying drawings, Figure 1 is a side view of the apparatus with the water reservoir or tank partly broken away to show the water level therein. Figs. 2 and 3 are side and end views respectively, of the automatic electric switch to control the air pressure within the tank. Fig. 4 is a side elevation, partly in section and on reduced scale, of the pump. Fig. 5 is a sectional view centrally of the air regulator. Fig. 6 is a sectional view, full size, of the lower portion of the water pump and the air injector or pump. Fig. 7 is a modification of the air injector or pump.

The invention is shown in its complete operative form in Fig. 1 as comprising a closed reservoir or tank 2 in which the water to be distributed is stored under pressure. The water is pumped into tank 2 by way of the discharge pipe 3 of a suitable pump 4 which draws its supply through an intake pipe 5 from any suitable source, such as a cistern or well. Pump 4 is provided with a pair of air drums or columns 6 and 6', one on the discharge side and the other on the suction side, see Fig. 4, and a set of spring-pressed valves 7 and 8 control the flow of water into and from the pump cylinder 9. The air drums or columns are of different sizes and prevent hammering in the pipes, as well as maintaining a uniform flow of water. The reciprocating piston 10 of the pump is connected to a crank shaft having a large band wheel driven by a belt 11 and electric motor 12. A belt to transmit the power is used as it is practically noiseless and also easy on the motor. Pumping of water occurs only at intervals, operation of the electric motor being controlled by an automatic electric switch 14 which is adapted to switch the electric current on after a given amount of water is withdrawn and the air pressure is decreased within definite limits as predetermined. Pumping of air into tank 2 occurs only when a deficiency of air exists. For this purpose a second smaller pump or air injector 15 is used, which is coupled with the bottom chamber 9' of pump 4 by a short pipe or connection 16, see Fig. 6. Air injector 15 comprises a hollow body forming a combined air and water chamber 17 into which a portion of the water from pump cylinder 9 is permitted to flow upon the downward movement or discharge stroke of piston 10, thereby compressing the air within chamber 17. The water is withdrawn more or less from chamber 17 upon the upward movement or suction stroke of piston 10, and air is then taken into the injector through the air intake duct 18 having check valve 19. A ball float valve 13 closes the communicating passage for pipe 16 when the water in chamber 17 is withdrawn entirely.

When the conditions permit and the air injector is in operation, the compressed air flows out of the upper end of chamber 17 past a second check valve 19 into a small pipe 20 leading to the upper end of tank 2, or more strictly speaking, to a float-controlled air regulator 21 which is detachably connected at its top and bottom with the side of tank 2 by pipe and union couplings 22. Air regulator 21 is shown in detail in Fig. 5 and so-called because it comprises a gage glass containing a cylindrical float 23 of relatively large displacement and of sufficient weight to hold a valve 24 down upon its seat 25 at the air entrance in the metal bottom of the gage glass, especially when said gage glass is free from water and also when partially filled with water, thereby shutting off the supply of air from air injector 15 during the greater or entire interval of time when the main pump 4 is operating and filling tank 2. In fact, air injector 15 is inoperative or ineffective except when the water pumped into tank 2 reaches a predetermined height capable of lifting float 23 and its valve 24 off seat 25. A check valve 26 is located beneath valve 24 to prevent the water in regulator 21 from entering pipe 20.

The service pipe 1 connects with the lower end of the tank, and a vent cock, drain cock, and a safety or blow-off valve, are provided for the tank and service pipe where needed.

Under normal conditions, pumping of water into tank 2 is in itself sufficient to compress the air in the tank until the desired air pressure is obtained, whereupon the automatic switch 14 is operated to stop the motor and further pumping. For this purpose, said switch is provided with a diaphragm 27 exposed to the air pressure in tank 2 by communicating pipe 28. A spring 29 seated upon said diaphragm is opposed to this upward movement of the diaphragm, and an adjustable screw member 29' affords means to vary the tension of the spring and to set the device for different air pressures. Assuming the operating pressure to be thirty-five pounds the diaphragm 27 will be lifted to tilt the pivoted lever 30 and through its forked end 31 to rotate the notched disk 32, which in turn is adapted to oscillate the split switch member 33 out of contacting relations with the beveled contact head 34. A snap movement is imparted to the switch operating parts by a coiled spring 35 connected to an arm 36 fixed on the shaft of disk 32, particularly when said spring is carried by arm 36 beyond a dead center line between the axis of the disk shaft and the anchoring post 37 for the spring, see Fig. 2. This device might be substituted by any other suitable electric switch and controller capable of being operated by the varying air pressure or rise and fall of the water in tank 2.

The height of the water in tank 2 can be observed ordinarily through the glass cylinder of regulator 21 but when a considerable amount of water is withdrawn from the tank the water within the regulator flows back into the tank. The withdrawal of water lowers the air pressure correspondingly in the tank until finally the electric switch 14 is thrown into action automatically by springs 29 and 35 and the motor started to operate pump 4. If the conditions are normal pumping will cease before float 23 is lifted, but if abnormal, for example, where a deficiency of air in the tank exists, then pumping of water continues until the water rises above the normal level and lifts float 23, thereby opening valve 24 and admitting fresh air as long as the air injector 15 and pump 4 continue to work together to built up an air pressure up to 35 pounds, if that be the air pressure desired. As soon as this air pressure is obtained the pumping stops, but a small amount of fresh air has been added to overcome the deficiency and if enough fresh air has been added the normal level of the water in the tank will be restored after further withdrawal of water and further operation of the pump 4. If not enough fresh air is added to supply the deficiency in a single cycle of operations then the succeeding cycle or cycles of operation will replenish all the deficiency until the water level is normal or as predetermined. In this way, the proportionate volume of air and amount of water is maintained constantly without material variation and it is never necessary to vent or drain the tank, and the apparatus will supply and always work properly to supply plenty of water indefinitey without demanding re-adjustments and constant attention.

The various parts of the apparatus as actually installed are more compactly related than as shown in Fig. 1, this disclosure being largely diagrammatic for a better understanding of the invention; that is, the tank, pump and motor are mounted on a single suitable base and the air controlled electric switch is mounted above the air regulator 21 at one side of tank 2. Air pipe 28 may be connected either directly to the tank or to the upper end of regulator 21. Other obvious modifications might be made without departing from the invention. For example, a modified form of air injector is shown in Fig. 7, comprising a casing 40 divided by a flexible diaphragm 41. A bottom nipple 42 is adapted to connect with the elbow connections 16 of pump 4, and the cover member of the casing is provided with air intake and outlet check valves 43 and 44, respectively. The air outlet 45 for this device connects with pipe 20 as in the other form of injector shown and described herein.

What we claim is:

1. In a water-distributing apparatus, a distributing tank, and means to establish and maintain definitely-fixed proportions of water and air under compression within said tank, comprising a water pump, an air injector, and controlling means having a self-closing valve to regulate the admission of air into the tank, said controlling means being operatively dependent upon intake of water in excess of predetermined requirements.

2. In a water-distributing apparatus, a storage tank having water distributing connections, a pump to force water into said tank, an air injector for said tank, and an air regulator comprising a float and valve to control the passage of air from said injector to said tank.

3. In a water-distributing apparatus, in combination, a closed tank having water-distributing pipe-connections, automatic means to store water under air pressure within said tank, and automatic means to inject air into said tank subsequently to a rise of water beyond a definitely-established working level or height of water within the tank.

4. In a water-distributing apparatus, a sealed tank having water-distributing connections, a pump to place water under air compression within said tank, means to operate said pump having a controlling device to stop and start the same automatically when an excess and lack of air pressure obtains in said tank, and an air injector and controlling means to regulate the admission of air into said tank during the latter stages of operation of said pump.

5. In a water-distributing apparatus, a closed tank and water-distributing connections therefor, means to store water under air pressure within said tank, an air injector for the tank, a valve to prevent the injection of air into said tank under normal operating conditions, and means operant by the water within the tank to open said valve when a deficiency of air exists and the water rises above a predetermined height.

6. In a water-distributing apparatus, a closed tank and a force pump to store water therein under air compression, an air injector for the tank operant by the water discharged by said pump, and controlling means having a float valve regulating the intake of air into the tank.

7. In a water-distributing apparatus, a supply reservoir and a pump to force water thereinto, an air injector for the tank, a gage glass in open communication with said injector and tank, and a float and valve within said gage glass to control the admission of air into said tank from said air injector.

8. In a water-distributing apparatus, a tank, a pump to force water into said tank, a gage glass for the tank having a float valve therein and an air intake controlled by said valve, and an air injector connected to said intake and operated by the water in its forced passage from said pump to said tank.

9. In a water-distributing apparatus, a closed tank, a pump to store water under air pressure within said tank, an air injector, a gage glass having pipe connections with said injector and tank, and a float valve and a check valve for said gage glass and injector pipe connection.

10. In a water-distributing apparatus, in combination, a sealed tank having water-distributing connections, a pump to store water within said tank under air compression, an air injector for the tank, an air regulator to control admission of air into said tank from said air injector, an electric motor to operate said pump and injector, and an electric switch to stop and start said motor having air-pressure controlling means in open communication with said tank.

11. In a water-distributing apparatus, a closed tank, a pump to force a supply of water into said tank under air compression, an air injector connected to the pressure chamber of said pump and operatively subject to the passage of water therethrough, an air regulator operatively subject to the water supplied to said tank, an air connection between said air injector and regulator, and means to keep said air connection free from water.

In testimony whereof we affix our signatures in presence of two witnesses.
EDWARD H. WEATHERHEAD.
THEODORE H. SCHUTT.
Witnesses:
T. T. BERRY,
W. J. RETZ.